US006864671B2

(12) United States Patent
Bernardon

(10) Patent No.: US 6,864,671 B2
(45) Date of Patent: Mar. 8, 2005

(54) DIRECT CURRENT VOLTAGE CONVERTER WITH SWITCHING REGULATOR

(75) Inventor: Derek Bernardon, Villach (AT)

(73) Assignee: Infineon Technologies AG, Munich (DE)

(*) Notice: Subject to any disclaimer, the term of this patent is extended or adjusted under 35 U.S.C. 154(b) by 0 days.

(21) Appl. No.: 10/719,798

(22) Filed: Nov. 21, 2003

(65) Prior Publication Data

US 2004/0124819 A1 Jul. 1, 2004

Related U.S. Application Data

(63) Continuation of application No. PCT/DE02/01600, filed on May 2, 2002.

(30) Foreign Application Priority Data

May 23, 2001 (DE) .......................................... 101 25 334

(51) Int. Cl.[7] ................................................ G05F 1/56
(52) U.S. Cl. ....................................................... 323/282
(58) Field of Search ......................................... 323/282

(56) References Cited

U.S. PATENT DOCUMENTS

| 3,781,642 | A |   | 12/1973 | Dutton .......................... 321/43 |
| 4,866,367 | A |   | 9/1989  | Ridley et al. ................ 323/287 |
| 5,055,767 | A |   | 10/1991 | Nelson ........................ 323/285 |
| 5,514,947 | A |   | 5/1996  | Berg ........................... 323/282 |
| 5,770,940 | A | * | 6/1998  | Goder .......................... 323/282 |
| 6,144,194 | A | * | 11/2000 | Varga .......................... 323/285 |
| 6,229,291 | B1 | * | 5/2001 | Matsumura et al. ......... 323/282 |
| 6,476,589 | B2 | * | 11/2002 | Umminger et al. ......... 323/282 |

FOREIGN PATENT DOCUMENTS

| EP | 1 073 187 A2 | 7/2000 | .......... H02M/3/156 |
| JP | 11262248 A   | 9/1999 | .......... H02M/3/155 |

OTHER PUBLICATIONS

"High Current Dual DC/DC Converter Operates from 3.3V Input"; A. Godil, Electronic Design, Penton Publishing, Cleveland, OH, vol. 47, No. 25, pp. 176A–176B, Dec. 6, 1999.
Linear Technology; "Dual 550Hz Synchronous 2–Phase Switching Regulator Controller", Linear Technology Corporation, Milpitas, CA, Dec. 1999.
"Considerations in Designing the Printed Circuit boards of Embedded Switching Power Supplies"; M. Brown, Fairchild Semiconductor, pp. 1–12, Apr. 30, 2000.
"Low Voltage, Precision Step–down Controller for Portable CPU Power", MAX 1636, pp, 1–22, Feb. 1998.
12V or Adjustable, High–Efficiency, Low $I_o$ Step–Up DC–DC Controller, MAX 1771, pp. 1–12, Jul. 1995.
"Halbleiter–Schaltungstechnik", paragraph 16.6.2; "Erzeugung des Schaltsignals" by U. Tietze et al., Springer Verlag Berlin, 11th Edition, Dec. 1999.

* cited by examiner

Primary Examiner—Jeffrey Sterrett
(74) Attorney, Agent, or Firm—Baker Botts L.L.P.

(57) ABSTRACT

A direct current voltage converter comprises a unit (BGR) for preparing a reference voltage (Vref), a regulator (OP), a pulse width modulator (Comp, Vsw), a voltage-controlled pole-changing switch (T, D), a storage choke (L) and a smoothing capacitor (C). An insulated line connects a reference potential, to which the input voltages of the regulator drop, with a ground terminal of the smoothing capacitor (C). In this way the noise signals of the direct current voltage converter are considerably reduced.

16 Claims, 2 Drawing Sheets

DIRECT CURRENT VOLTAGE CONVERTER WITH SWITCHING REGULATOR

CROSS REFERENCE TO RELATED APPLICATION

This application is a continuation of copending International Application No. PCT/DE02/01600 filed May 2, 2002, and claiming a priority date of May 23, 2001, which designates the United States.

TECHNICAL FIELD OF THE INVENTION

The invention concerns mains supply circuits for electric power supply. In particular the invention concerns a direct current converter with a switching regulator.

DESCRIPTION OF THE RELATED ART

Every electronic device requires an electric power supply. In general the power supply must provide direct voltage. Since batteries are uneconomical in the case of a higher power requirement of the electronic device, the required direct voltage is generated in mains supply circuits by converting and rectifying a mains voltage. The direct current thus obtained frequently has a considerable ripple and also varies in the case of fluctuations of the mains voltage, the load current, and the temperature. For this reason, as a rule, the output voltage of the rectifier circuit is not used directly as supply voltage for electronic circuits, but is preliminarily fed to a voltage regulator, which corrects the fluctuations. The voltage regulator may, fore example, have a control transistor, which compares the output voltage of the rectifier circuit with a reference voltage and regulates the output voltage of the voltage regulator to a predetermined value, which is derived from the reference voltage.

In the case of the mains supply circuits described, the mains converter, the rectifier, and the control converter are the important loss sources for electrical energy. The efficiency of such a mains supply circuit frequently amounts to only 25% to 50%. However, the losses in the voltage regulator may be greatly reduced by replacing the continuously regulated regulating transistor with a timed switch. The output voltage then may be determined from the ratio of the time intervals in which the switch is opened, respectively closed. In order to obtain the desired output voltage, a low-pass filter, that forms the average value over time, also is required. If an LC low pass filter is used, there is no more systematic loss source in the so-called switching regulator.

Direct voltage converters with switching regulators are known from Section 16.6.2, "Generating the switching signal", of the book "Semiconductor-Switching Technology" by Ulrich Tietzte and Christoph Schenk, Springer Verlag, Berlin, 1999, 11th edition, ISBN 3-540-64192-0. This section is herewith absorbed into the disclosure content of the present patent application. The direct current voltage converter described there represents the closest prior art to the present invention.

FIG. 1 schematically shows the circuit diagram of the direct current voltage converter of the type known with a switching regulator. An MOS transistor T, a diode D, a storage choke L, and a smoothing capacitor C are required as essential components of a direct current voltage converter for direct current voltage conversion of an input voltage Vin into an output voltage Vout. In this case the MOS transistor T is an n-channel MOS transistor and functions together with the diode D as a voltage-controlled pole changing switch. The storage choke L is a coil. The input voltage Vin is present on the drain terminal of the MOS transistor T. The source of the MOS transistor T is connected with a terminal of diode D. The other terminal of diode D is on a common fixed potential GNDpw. A further connection to the input of the storage choke L goes from the connection between the MOS transistor T and the diode D. The output of the storage choke L is connected with another terminal of the smoothing capacitor C. A common fixed potential GNDpw is on the other terminal of the smoothing capacitor C. The output voltage Vout may be tapped at the output of the storage choke L.

If the drain-source-distance of the MOS transistor T is made conducting through an appropriate gate potential, the input voltage Vin is approximately on the diode D, so that the diode D blocks, and a current flows through the MOS transistor T. If the MOS transistor T is blocked, a current flows through diode D. This circuit arrangement produces a pole changing switch in a simple way.

In the case of the present circuit arrangement, a current constantly flows through the storage choke L, which charges the smoothing capacitor C. The value of the current flowing through the storage choke L varies with time, it s characteristic is decisively determined by the switch position of the MOS transistor T. The variation over time of the current that flows through the storage choke L, may be calculated from the induction law. A downwards direct current voltage converter is produced by the existing circuit arrangement of the pole changing switch and the storage choke, so that the output voltage Vout assumes a lover value than the input voltage Vin. The factor by which the output voltage Vout is lower than the input voltage Vin is determined by the length of the time interval in which the MOS transistor T is connected, respectively blocked. The smoothing capacitor C smoothes the output voltage Vout as a low pass filter. The ripple of the output voltage is determined by the dimensioning of the smoothing capacitor C.

The generation of the switching signal for the MOS transistor T is performed with a regulator and a pulse-width modulator. The regulator has an operation amplifier OP, that is connected as a proportional integral regulator. The output signal on the output of the storage choke L is connected back to the inverting input of the operation amplifier OP. The operation amplifier OP is supplied with a reference voltage Vref at its non-inverting input. The reference voltage Vref is brought to a common fixed potential GNDref. The operation amplifier OP is connected with resistors R1, R2, R3, R4, and capacitors C1, C2. The operation amplifier OP forms the difference between the output voltage Vout provided with a weighting and the reference voltage Vref. At its output the operation amplifier OP generates a control voltage Verr depending on this difference. The control voltage Verr acts on the pulse width modulator and is varied until the difference on the inputs of the operation amplifier OP assumes the value zero.

The pulse width modulator includes a comparator Comp, that is realized by an operation amplifier. The non-inverting input of the comparator Comp is supplied by the control voltage Verr. A sawO-tooth voltage Vsw lies on the inverting input of the comparator Comp. The output of the comparator controls the gate potential of the MOS transistor T. Because of its wiring the comparator Comp makes a comparison between the value of the control voltage Verr and the instantaneous value of the saw-tooth voltage Vsw. As long as the control voltage Verr is smaller than the saw-tooth voltage Vsw, the comparator connects the comparator Comp with the MOC transistor T. Otherwise, the drain-source space of the MOS transistor is blocked.

A gate potential which is positive with respect to the input voltage Vin, is necessary in order to bring the MOS transistor T into the Ohm range. For this, an MOS driver Driv is connected between the comparator Comp and the MOS transistor T. An auxiliary voltage is generated in the MOS driver Driv, which is positive with respect to the source potential of the MOS transistor T.

In many applications direct current voltage converters with low noise amplitudes of their output signals are necessary. This is particularly true of low frequencies, at which switching regulators are frequently operated. In particular, the components located at the output of the direct current voltage converter cause noise voltages and noise currents. These noise signals also influence other noise-sensitive components of the direct current voltage converter. The noise signals may be particularly troublesome when the direct current voltage converter has a high dynamic. This may generate sub-harmonic oscillations.

Noise signals that are superimposed over the reference voltage Vref act particularly strongly. These noise signals are further amplified by the control voltage Verr and thus finally overlap almost all signals if the circuit. The operation of the direct current voltage converter may be considerably limited under certain circumstances in this way.

A known possibility of damping noise signals consists in removing the noise-sensitive components of the direct current voltage converter as far as possible from the output of the direct current voltage transformer. These components are brought to the common fixed potential GNDref as shown in FIG. 1. For example, this obtains for the inputs of the operation amplifier OP. Of course, the feedback circuit is brought to the common fixed potential GNDfb and thus also the control voltage Verr on the output of the operation amplifier OP. Since the two common fixed potentials GNDref and GNDfb lie as far from each other as possible, in order to maintain the reference voltage Vref with low noise, and furthermore, high AC and DC currents flow between the common fixed potentials GNDfb, GNDpw, and GNDref, a not-negligible potential difference appears between the two common fixed potentials GNDref and GNDfb. This potential difference may amount to several tenths of a millivolt, and generates great noise signals at the inputs of the operation amplifier OP.

A further known measure for suppressing noise signals provides that the dynamic behavior of the direct current voltage converter is reduced. This does reduce the noise signals, but this measure also entails a deterioration of the operation of the direct current voltage converter.

SUMMARY OF THE INVENTION

Therefore the object of the invention is to create a direct current voltage amplifier, the signals of which are overlapped by small noise signals, the measures that are taken for reducing the noise signals not significantly impairing the operation of the direct current voltage converter.

The basic object of the invention can be achieved by a direct current voltage converter for converting an input voltage into an output voltage comprising a unit for preparing a reference voltage having a ground terminal which is connected with a first common fixed potential, a regulator for regulating the output voltage to a predetermined fraction of the reference voltage, wherein a first voltage, that is derived from the output voltage, is applied to a first input of the regulator, a second voltage, that is derived from the reference voltage is applied to a second input of the regulator, and a control voltage may be tapped at an output of the regulator, a pulse width modulator for comparing the control voltage with an alternating voltage, a voltage-controlled pole-changing switch comprising two inputs and an output for connecting one of the two inputs with the output, the input voltage being applied to one of the two inputs and a second common fixed potential being applied to the other of the inputs and a control terminal of the voltage-controlled pole-changing switch may be supplied by the pulse width modulator, a storage choke, the input of which is connected with the output of the voltage-controlled pole-changing switch, and the output voltage may be tapped at the output thereof, a smoothing capacitor, the first terminal of which is connected with the output of the storage choke and the second terminal thereof being connected with a third common fixed potential, a reference potential, to which the first voltage and the second voltage drop, is connected through an insulated line with the second terminal of the smoothing capacitor, and a low pass filter connected between the unit for preparing the reference voltage and the second input of the regulator, the low pass filter having a capacitor, one terminal of which is connected via the insulated line with the second terminal of the smoothing capacitor.

The other terminal of the capacitor can be coupled with the low pass filter at the second input of the regulator, and the low pass filter may have a resistor, which is connected between the unit for preparing the reference voltage and the second input of the regulator, and in particular may include a further capacitor which is connected between the unit for preparing the reference voltage and the first common fixed potential. A voltage divider, one input of which is connected with the output of the storage choke and the other input of which is connected with the second terminal of the smoothing capacitor, can be connected in front of the first input of the regulator. The pulse width modulator may comprise a comparator and a generator for generating a saw-tooth voltage, wherein the saw-tooth voltage is applied to the first input of the comparator and the control voltage is applied to the second input of the comparator. The voltage-controlled pole-changing switch may include an MOS transistor, the drain-source space of which is supplied by the input voltage and which, in particular is an n-channel MOS transistor, and a diode, which is coupled with the second common fixed potential. At least the regulator, in a given case the comparator, in a given case the low pass filter and in a given case the voltage divider can be monolithically integrated on one common substrate, the common substrate having a ground terminal and which may be connected by the insulated line with the second terminal of the smoothing capacitor. The second terminal of the smoothing capacitor can be connected with an external common fixed potential, in particular a ground. The common substrate may be connected with the external common fixed potential. exclusively via the ground connection. Further noise-sensitive components can be integrated on the common substrate, the reference potentials of which components are connected with the ground terminal of the common substrate. The unit for preparing the reference voltage can be a band spacing reference circuit. An MOS driver can be connected between the pulse width modulator and the MOS transistor. The regulator may have an operation amplifier, which is connected in particular as a proportional integral regulator.

The object can also be achieved by a method for converting an input voltage into an output voltage comprising the steps of:

preparing a reference voltage in relation to a first common potential, regulating the output voltage to a predetermined fraction of the reference voltage, wherein a first voltage is derived from the output voltage and a second voltage is derived from the reference voltage, and a control voltage is derived from the first and second voltage, comparing the control voltage with an alternating voltage, connecting the input voltage or a second common fixed potential with a first output depending on the comparison of the control voltage, coupling the first output through a storage choke and a smoothing capacitor with a third common fixed potential wherein the output voltage is accessible at the coupling of the choke and the capacitor, and low pass filtering the reference voltage in relation to the third common fixed potential to generate the second voltage, wherein the control voltage is generated in relation to the third common fixed potential.

The step of comparing may include the step of generating a saw-tooth voltage.

A direct current voltage converter in accordance with the invention for converting an input voltage into an output voltage, thus, may comprise a unit, a regulator, a pulse width modulator, a voltage-controlled pole changing switch, a storage choke, and a smoothing capacitor. The unit serves for preparing a reference voltage. The ground terminal of the unit is connected with a first common fixed potential. There is a first voltage, which is derived from the reference voltage, at a first input of the regulator. There is a second voltage, which is derived from the reference voltage, at a second input of the regulator. The regulator regulates the output voltage to a predetermined fraction of the reference voltage. The predetermined fraction is, for example, determined by the dimensioning of the resistors and capacitors, with which the regulator is connected. The regulator generates a control voltage at its output for regulating the output voltage. The pulse width modulator compares the control voltage with an alternating voltage, which may, for example, by a saw-tooth voltage. The pulse width modulator uses the comparison value thus obtained for controlling the voltage-controlled pole changing switch. The pole changing switch connects either its first input or its second input with its output. The input voltage is applied to the first input and a second common fixed potential is applied to the second input. The output of the voltage-controlled pole changing switch is connected with the input of the storage choke. The output voltage may be tapped at the output of the storage choke. The first terminal of the smoothing capacitor is connected with the output of the storage choke and the second terminal of the smoothing capacitor is connected with a third common fixed potential. An essential concept of the invention consists in the fact that a reference potential, to which the first and second voltage drop, is connected by an insulated line with the second terminal of the smoothing capacitor.

The advantage of the invention is that the first and second voltage, which are the input voltages of the regulator, are brought to the third common potential by the line in accordance with the invention. In this case the potential difference, that exists between the first and third common fixed potential, does not act on the first and second voltage. Since the line in accordance with the invention insulates, no currents can flow to them from adjacent properties of the direct current voltage converter in accordance with the invention. This was also confirmed experimentally. The experiments conducted have shown that the noise level within the entire direct current voltage converter is reduced by the measures in accordance with the invention, and thus the operation of the direct current converter is not impaired. The reason for this is that reduced noise signals of the input voltages of the converter also have an influence on the noise signals of the other components, in particular on the noise signals of the output voltage, since the input voltages directly influence the behavior of the entire direct current voltage converter. Furthermore, in the experiments conducted it proved to be the case that sub-harmonic oscillations no longer appear in the entire circuit, and that the signal to noise ratio of the control voltage has almost ideal values.

A further advantage of the invention consists in the fact that the great spatial separation between the components, that generate noise signals, and can be maintained by the noise-sensitive components. This is particularly essential for RFD applications.

Advantageously the direct current converter includes a low pass filter, which is connected between the unit for preparing the reference voltage and the second input of the regulator. The low pass filter has a capacitor, one terminal of which is connected with the second terminal of the smoothing capacitor via the insulated line. By means of this measure the second voltage, which is derived from the reference voltage, is brought to the third common fixed potential instead of the first common fixed potential. In this way the potential difference, that existed originally between the reference potential of the second voltage and the third common fixed potential, and thus reduces the noise level of the signals of the direct current voltage converter. Further, possible AC signals, which are superimposed over the reference voltage Vref, are eliminated by the low pass filter.

A simply equipped and thus easily made low pass filter also contains a resistance, which is connected between the unit for preparing the reference voltage and the second input of the regulator. The second input of the regulator also is connected with the other terminal of the capacitor of the low pass filter. For example, a further capacitor may be connected between the unit for preparing the reference voltage and the first common fixed potential. This has the advantage that the low pass filter thus acts in both directions.

An advantageous configuration of the invention is characterized by the fact that a voltage divider is connected in front of the first input of the regulator. The output voltage, respectively the third common fixed potential, is applied to the inputs of the voltage divider. This measure represents a possibility for bringing the first voltage to the third common fixed potential.

In accordance with a further advantageous configuration of the invention, the pulse width modulator includes a comparator and a generator, which generates a saw-tooth voltage. The function of the comparator is to compare the saw-tooth voltage with the control voltage. An output signal of the comparator, with which the voltage-controlled pole changing switch may be controlled, results from this comparison. Furthermore, it may advantageously be provided that the voltage-controlled pole-changing switch includes a MOS transistor and a diode. The MOS transistor and the diode are directly connected, so that either the input voltage or the second common fixed potential acts on the input of the storage choke, depending on the gate potential of the MOS transistor.

A particularly preferred configuration of the invention provides that the controller and, in a given case, the comparator, the low pass filter, as well as the voltage divider, are monolithically integrated on a common substrate. This allows for economical production of the components concerned. Further the common substrate has a ground connection, to which the second terminal of the smoothing capacitor and thus the third common fixed potential may be applied. For example, further noise-sensitive components may be integrated on the common substrate. The ground connections of the noise-sensitive components are connected with the ground terminal of the common substrate. Noise signals, which could overlap the signals of the noise-sensitive components, are largely suppressed in this way.

Advantageously the second terminal of the smoothing capacitor may be connected with an external common fixed potential, in particular a ground. If the direct current voltage converter is incorporated in a circuit system, it is advantageous to bring all circuits of the circuit system to a common fixed potential. This prevents potential differences between different common fixed potentials, which could lead to bad signal to noise ratios of the circuits. Furthermore, it is advantageous if the substrate has precisely one terminal to the external common fixed potential. This connection is made via the ground terminal of the common substrate. The precisely one terminal is advantageous if in this way ground circuits, through which noise signals would be generated, are avoided.

A further particularly preferred configuration of the invention is characterized by the fact that the unit for preparing the reference voltage is a band spacing reference circuit. The principle of a band spacing reference circuit consists in adding two partial signals that have opposite temperature behavior. The two partial signals may be voltages or currents. While one of the two partial signals drops with increasing, the other partial signal rises with increasing temperature. A reference signal independent of temperature is derived from the sum of the two partial signals over a certain range. Further, the reference voltage generated by a band spacing reference circuit is largely independent of oscillations of the supply voltage.

BRIEF DESCRIPTION OF THE DRAWINGS

The invention is explained in greater detail below with reference to the drawings. Here.

DETAILED DESCRIPTION OF THE PREFERRED EMBODIMENTS

Figure 1:
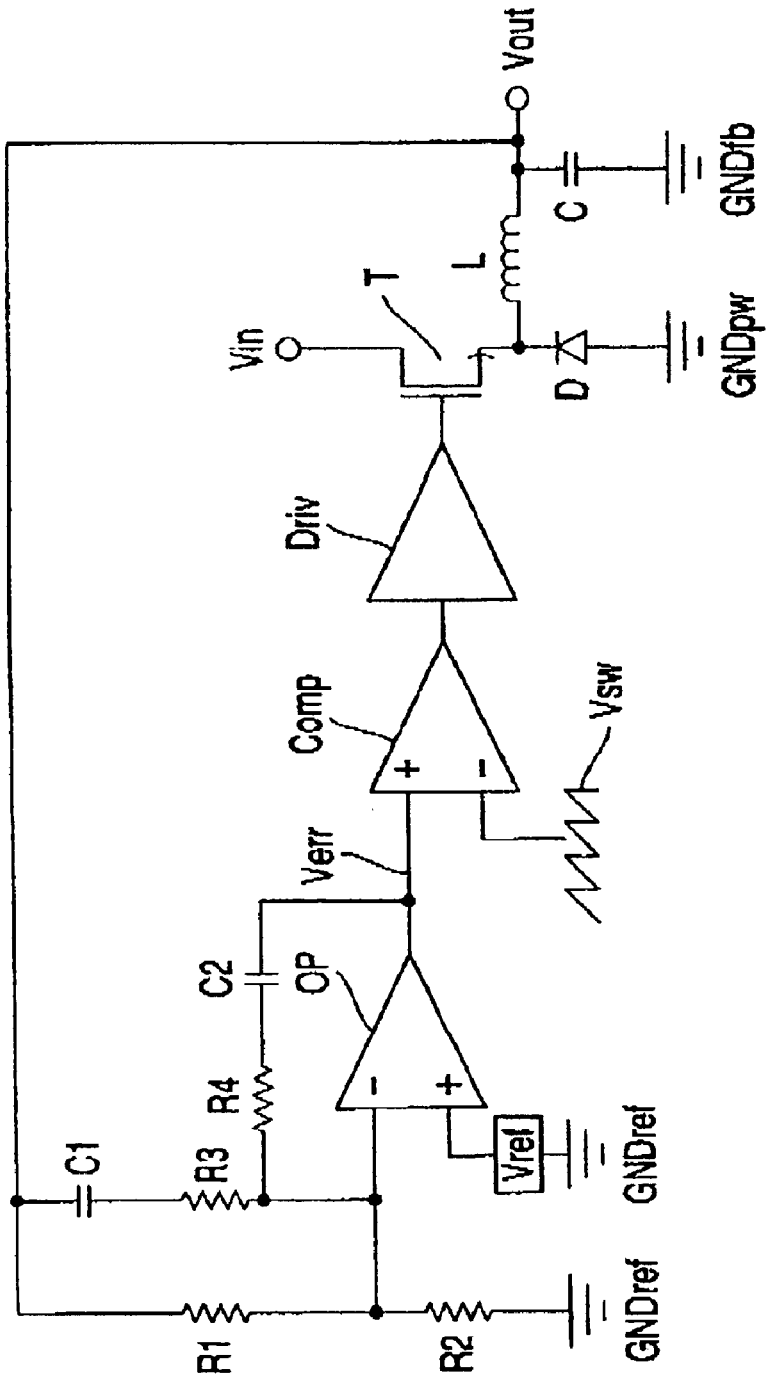
FIG. 1 shows a schematic circuit diagram of a direct current voltage converter with a switching regulator in accordance with the prior art.
Figure 2:
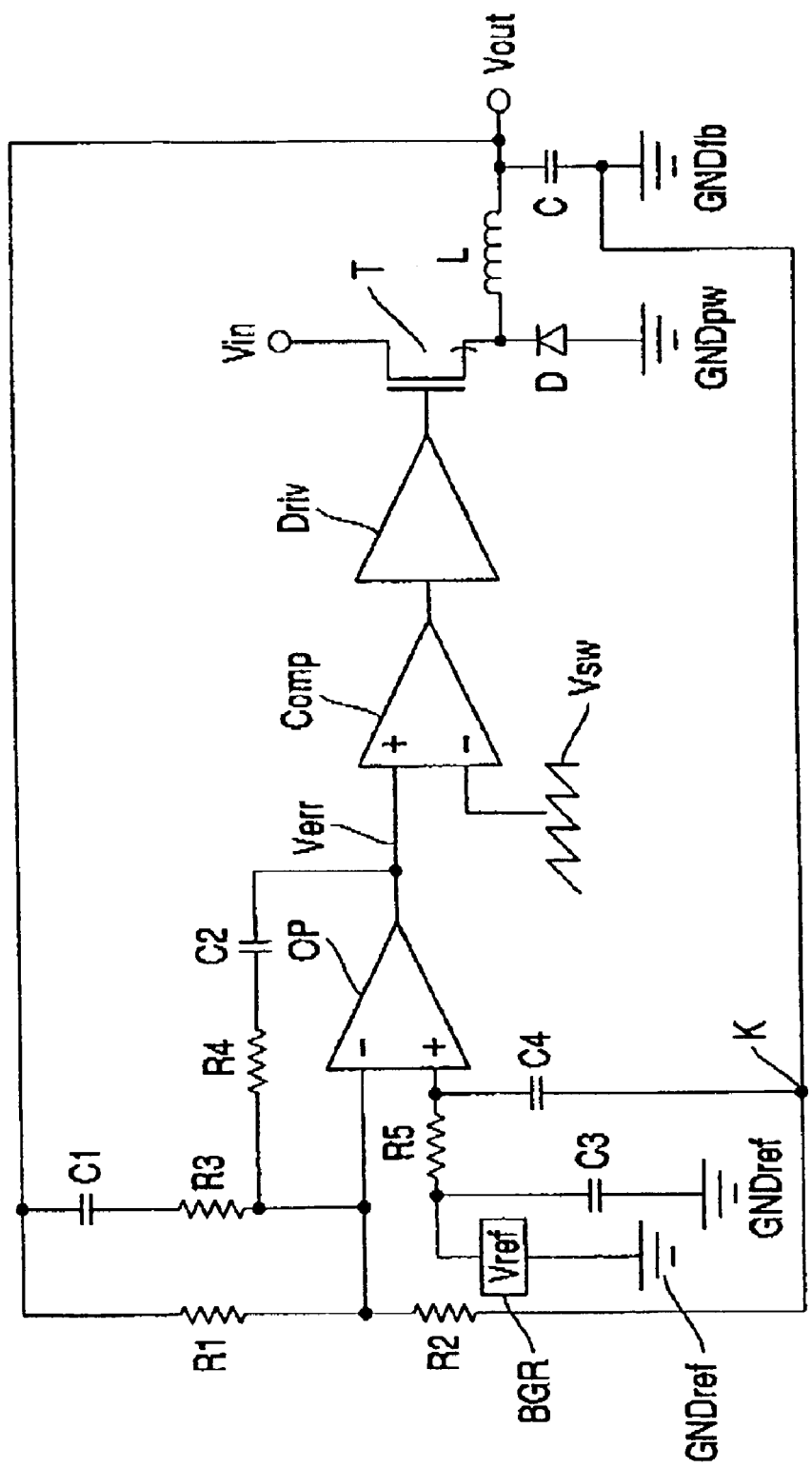
FIG. 2 shows a schematic circuit diagram of an embodiment of the direct current voltage converter in accordance with the invention.

The embodiment of the invention shown in FIG. 2 in many parts is identical to the direct current voltage converter shown in FIG. 1. There are differences, in particular, in the wiring of the common fixed potentials GNDref and GNDfb. In the embodiment shown in FIG. 2 a low pass filter is connected between a band spacing reference circuit BGR, which prepares the reference voltage Vref, and the non-inverting input of the operation amplifier OP. The low pass filter includes a capacitor C3, which is connected between the band spacing reference circuit BGR and the common fixed potential GNDref and a resistance RS, which is connected in series between the band spacing reference circuit BGR and the operation amplifier OP, as well as a capacitor C4, one terminal of which is connected with the non-inverting input of the operation amplifier OP. One function of the low pass filter is to bring the reference voltage Vref to the common fixed potential GNDfb. In addition, the other terminal of the capacitor C4 is connected via a node K with the terminal of the smoothing capacitor C, to which the common fixed potential is GNDfb is applied. The ground terminal of the band spacing reference circuit BGR is connected with the common fixed potential GNDref. Furthermore, the resistance R2, which is connected with the common fixed potential GNDref in the circuit diagram shown in FIG. 1, now is connected via node K with the common fixed potential GNDfb. In this way the input voltages and the output voltages of the operation amplifier OP as well as the output voltages Vout of the existing direct current voltage converter are brought to the common fixed potential GNDfb. As a consequence of this, noise signals are largely suppressed.

It may be provided that the node K is a ground terminal of a circuit monolithically integrated on a common substrate. The integrated circuit could, for example, contain the operation amplifier OP, the comparator Comp, the MOPS driver Driv, the MOS transistor T, and possibly other components. An insulated line could go from the node K to the common fixed potential GNDfb. Insulation of the line guarantees that no undesirable currents flow from other components or a substrate to the line. These currents could cause potential differences and thus generate noise signals.

The integrated circuits further could be integrated into a system of circuits. In this case it would be advantageous to connect the ground terminals of all circuits radially for reducing noise signals.

I claim:

1. A direct current voltage converter for converting an input voltage into an output voltage comprising:

a unit for preparing a reference voltage having a ground terminal which is connected with a first common fixed potential, a regulator for regulating the output voltage to a predetermined fraction of the reference voltage, wherein a first voltage, that is derived from the output voltage, is applied to a first input of the regulator, a second voltage, that is derived from the reference voltage is applied to a second input of the regulator, and a control voltage may be tapped at an output of the regulator, a pulse width modulator for comparing the control voltage with an alternating voltage, a voltage-controlled pole-changing switch comprising two inputs and an output for connecting one of the two inputs with the output, the input voltage being applied to one of the two inputs and a second common fixed potential being applied to the other of the inputs and a control terminal of the voltage-controlled pole-changing switch may be supplied by the pulse width modulator, a storage choke, the input of which is connected with the output of the voltage-controlled pole-changing switch, and the output voltage may be tapped at the output thereof, a smoothing capacitor, the first terminal of which is connected with the output of the storage choke and the second terminal thereof being connected with a third common fixed potential, a reference potential, to which the first voltage and the second voltage drop, is connected through an insulated line with the second terminal of the smoothing capacitor, and a low pass filter connected between the unit for preparing the reference voltage and the second input of the regulator, the low pass filter having a capacitor, one terminal of which is connected via the insulated line with the second terminal of the smoothing capacitor.

2. The direct current voltage converter in accordance with claim 1, wherein the other terminal of the capacitor is coupled with the low pass filter at the second input of the regulator, and
the low pass filter comprises a resistor, which is connected between the unit for preparing the reference voltage and the second input of the regulator, and a further capacitor which is connected between the unit for preparing the reference voltage and the first common fixed potential.

3. The direct current voltage converter in accordance with claim 1, wherein a voltage divider, one input of which is connected with the output of the storage choke and the other input of which is connected with the second terminal of the smoothing capacitor, provides the first voltage to the first input of the regulator.

4. The direct current voltage converter in accordance with claim 3, wherein at least one of the devices from the group consisting of the regulator, the low pass filter and the voltage divider, are monolithically integrated on one common substrate, the common substrate having a ground terminal and which may be connected by the insulated line with the second terminal of the smoothing capacitor.

5. The direct current voltage converter in accordance with claim 1, wherein the voltage-controlled pole-changing switch includes an MOS transistor, the drain-source space of which is supplied by the input voltage and which is an n-channel MOS transistor, and a diode, which is coupled with the second common fixed potential.

6. The direct current voltage converter in accordance with claim 1, wherein at least one of the devices from the group consisting of the regulator, and the low pass filter, are monolithically integrated on one common substrate, the common substrate having a ground terminal and which may be connected by the insulated line with the second terminal of the smoothing capacitor.

7. The direct current voltage converter in accordance with claim 6, wherein an MOS driver is connected between the pulse width modulator and the MOS transistor.

8. The direct current voltage converter in accordance with claim 6, wherein the common substrate may be connected with an external common fixed potential exclusively via a ground connection.

9. The direct current voltage converter in accordance with claim 1, wherein
the pulse width modulator comprises a comparator and a generator for generating a saw-tooth voltage, the saw-tooth voltage being applied to the first input of the comparator and the control voltage being applied to the second input of the comparator.

10. The direct current voltage converter in accordance with claim 9, wherein at least one of the devices from the group consisting of the regulator, the comparator, and the low pass filter, are monolithically integrated on one common substrate, the common substrate having a ground terminal and which may be connected by the insulated line with the second terminal of the smoothing capacitor.

11. The direct current voltage converter in accordance with claim 1, wherein the unit for preparing the reference voltage is a bandgap reference circuit.

12. The direct current voltage converter in accordance with claim 1, wherein the regulator has an operation amplifier, which is connected in particular as a proportional integral regulator.

13. The direct current voltage converter in accordance with claim 1, wherein the third common fixed potential is ground.

14. The direct current voltage converter in accordance with claim 13, wherein furthermore noise-sensitive components are integrated on a common substrate, the reference potentials of which components are connected with the ground terminal of the common substrate.

15. A method for converting an input voltage into an output voltage comprising the steps of:
preparing a reference voltage in relation to a first common potential,
regulating the output voltage to a predetermined fraction of the reference voltage, wherein a first voltage is derived from the output voltage and a second voltage is derived from the reference voltage; and a control voltage is derived from the first and second voltage,
comparing the control voltage with an alternating voltage,
connecting the input voltage or a second common fixed potential with a first output depending on the comparison of the control voltage,
coupling the first output through a storage choke and a smoothing capacitor with a third common fixed potential wherein the output voltage is accessible at the coupling of the choke and the capacitor, and
low pass filtering the reference voltage in relation to the third common fixed potential to generate the second voltage, wherein the control voltage is generated in relation to the third common fixed potential.

16. The method in accordance with claim 15, wherein the step of comparing includes the step of generating a saw-tooth voltage as the alternating voltage.

* * * * *